(12) United States Patent
Sekerak et al.

(10) Patent No.: US 9,095,144 B1
(45) Date of Patent: Aug. 4, 2015

(54) WEIGHING APPARATUS AND CONVEYORS SYSTEMS INCORPORATING A WEIGHING APPARATUS

(75) Inventors: Cara J. Sekerak, Lakeville, MN (US); Terry G. Reishus, Egan, MN (US); Craig A. Dowd, Eagan, MN (US); Craig E. Gustafson, Bloomington, MN (US)

(73) Assignee: General Mills, Inc., Minneapolis, MN (US)

( * ) Notice: Subject to any disclaimer, the term of this patent is extended or adjusted under 35 U.S.C. 154(b) by 715 days.

(21) Appl. No.: 13/214,763

(22) Filed: Aug. 22, 2011

Related U.S. Application Data (60) Provisional application No. 61/379,416, filed on Sep. 2, 2010.

(51) Int. Cl.
*A21C 9/04* (2006.01)

(52) U.S. Cl.
CPC ........................................ *A21C 9/04* (2013.01)

(58) Field of Classification Search
USPC ................. 99/450.1, 486; 425/208, 140–145; 426/502–517; 177/16, 121, 123, 50, 177/145, 119, 120.3
See application file for complete search history.

(56) References Cited

U.S. PATENT DOCUMENTS

| | | | |
|---|---|---|---|
| 3,180,475 A * | 4/1965 | Del Rosso | 177/145 |
| 3,439,761 A * | 4/1969 | Laimins | 177/211 |
| 3,960,225 A * | 6/1976 | Hyer et al. | 177/121 |
| 4,322,202 A * | 3/1982 | Martinez | 425/208 |
| 4,526,244 A * | 7/1985 | Chauveau | 177/1 |
| 4,631,021 A * | 12/1986 | Hayashi | 425/140 |
| 4,729,442 A * | 3/1988 | Sichet | 177/50 |
| 5,092,757 A * | 3/1992 | Stein et al. | 425/363 |
| 5,112,631 A * | 5/1992 | Nakamura | 426/297 |
| 5,285,019 A * | 2/1994 | Kempf et al. | 177/16 |
| 5,296,654 A * | 3/1994 | Farley et al. | 177/145 |
| 5,304,745 A | 4/1994 | Rusk et al. | |
| 5,505,970 A * | 4/1996 | Morikawa | 426/231 |
| 5,547,034 A * | 8/1996 | Wurz et al. | 177/25.13 |
| 5,689,092 A * | 11/1997 | Wurz et al. | 177/145 |

(Continued)

FOREIGN PATENT DOCUMENTS

| | | |
|---|---|---|
| EP | 145351 A2 | 6/1985 |
| JP | 2004-000301 A | 8/2004 |

OTHER PUBLICATIONS

Brochure of Schenk Weighing Systems entitled "One Idler Belt Scale Schenck model BEZ" (2 pages).

(Continued)

*Primary Examiner* — Dana Ross
*Assistant Examiner* — Renee L Miller
(74) *Attorney, Agent, or Firm* — Paul J. LaVanway, Jr.; John L. Crimmins (57) ABSTRACT

A weighing apparatus comprising a weigh deck, one or more load cells, and two staging bars. The weighing apparatus is configured to be installed in an existing conveyor system having a frame and a conveyor belt so that the weigh deck is generally flush with the frame and the weigh deck and the staging bars are positioned underneath the conveyor belt. The staging bars are positioned to mitigate weight measurement variations produced by the conveyor belt. In many cases, the staging bars are vertically adjustable. One or more weigh bridges can be incorporated into a production line or conveyor system.

17 Claims, 9 Drawing Sheets

(56) References Cited

U.S. PATENT DOCUMENTS

| | | | |
|---|---|---|---|
| 5,853,783 A * | 12/1998 | Rijkaart | 426/496 |
| 6,524,090 B1 * | 2/2003 | Hayashi et al. | 425/140 |
| 6,685,457 B2 * | 2/2004 | Hayashi et al. | 425/140 |
| 6,800,313 B2 * | 10/2004 | Hayashi et al. | 426/231 |
| 7,344,082 B2 * | 3/2008 | Zhu et al. | 235/462.14 |
| 7,586,049 B2 * | 9/2009 | Wurz | 177/25.13 |
| 7,906,240 B2 | 3/2011 | Ishii et al. | |
| 2003/0136589 A1 * | 7/2003 | Dietrich | 177/16 |
| 2004/0009253 A1 * | 1/2004 | Hayashi et al. | 425/208 |
| 2010/0166902 A1 * | 7/2010 | Kuribayashi et al. | 425/140 |

OTHER PUBLICATIONS

Brochure of AccuRate Bulk Solids Metering entitled "Bulk Solids Metering Products" from Pesco, Inc., 2003 (11 pages).

* cited by examiner

WEIGHING APPARATUS AND CONVEYORS SYSTEMS INCORPORATING A WEIGHING APPARATUS

CROSS-REFERENCE TO RELATED APPLICATIONS

This application claims the benefit of priority under 35 U.S.C. 119(e)(1) of a provisional patent application Ser. No. 61/379,416, filed Sep. 2, 2010, which is incorporated herein by reference in its entity.

FIELD OF THE INVENTION

The invention relates to weighing apparatus and conveyor system for weighing materials. In some cases, a weighing apparatus and conveyor system is provided for weighing a continuous flow of material.

BACKGROUND

Various materials are conveyed by conveyor systems as a continuous flow of material. For example, bulk materials can be transported as a continuous flow of material through a conveyor system. Bulk materials can include loose materials such as grain, gravel, and coal or other materials such as dough. Dough is often placed through an extruding apparatus and is extruded as a continuous sheet or ribbon of dough. This continuous sheet of dough can then be transported through a conveyor system where various operations are performed on the dough. Often times, it is necessary to weigh a continuous flow of material as it moves through a conveyor system. The present invention provides an economical and practical weighing apparatus and conveyor system for weighing a continuous flow of material.

SUMMARY OF THE INVENTION

A weighing apparatus is provided that can be installed in a new conveyor system or advantageously retrofitted on an existing conveyor system in a production line for weighing a continuous flow of material. Many existing production lines with conveyor systems take up a lot of space in a manufacturing facility. Commonly, production lines are custom made to fit limited space in existing manufacturing facilities. As such, it is impractical and uneconomical to replace existing conveyor systems with commercial conveyor systems that have built-in weighing systems. The present weighing apparatus is desirable because one or more can be installed in any type of conveyor system.

The weighing apparatus is configured to weigh a continuous flow of material. As used herein, the term "continuous flow of material" refers to an uninterrupted flow of material that is conveyed through a conveyor system. One exemplary characteristic of a continuous flow of material that can be processed on the weighing apparatus is a material that is connected to or continuous with material both in front of the weighing apparatus and behind the weighing apparatus. The continuous flow of material can be grain, gravel, coal, dough or another bulk material that is transported in a continuous, uninterrupted manner. In some cases, the material is a continuous sheet of dough. In many cases, the continuous flow of material is a material having a weight of about 0.02 lb/ft² (0.1 kg/m²) to about 150 lb/ft² (732.4 kg/m²) as it is conveyed through a conveyor system. The weighing apparatus is particularly adapted for weighing a continuous flow of material that is lightweight. As such, in certain cases, the material is a lightweight material having a weight of less than 10 lb/ft² (48.8 kg/m²) or less than 5 lb/ft² (24.4 kg/m²). It is difficult to measure a continuous flow of lightweight material because less weight generally leads to a higher inaccuracy in weight measurements. However, the weighing apparatus is capable of accurately measuring a lightweight continuous flow of material. In certain cases, the continuous flow of material has an actual weight, and the weighing apparatus obtains a measured weight that is approximately 80% of the actual weight. Through a linear regression model, the actual weight can be predicted within about ±4% of the actual weight.

The weighing apparatus can allow for automated weighing of a continuous flow of material. This is advantageous over prior weighing methods which involve manual methods of weighing the material, which require stoppage of the process or flow to obtain samples, or require unnecessary handling of samples. For example, in prior operations involving continuous sheets of dough, an operator periodically samples a sheet of dough by cutting small samples from the dough sheet and measures them offline. The operator then uses these measurements to estimate the entire weight (e.g., in lb/ft²) of the continuous sheet on the conveyor line. Such prior manual weighing methods are cumbersome, time-consuming, and allow room for operator-error. Additionally, such prior manual methods assume that the entire continuous flow of material on the conveyor line is uniform and thus the sample measurements are representative of the entire flow of material. The weighing apparatus allows for automated weighing, which remedies the problems seen with manual weighing methods.

Embodiments of the weighing apparatus includes a weigh deck, one or more load cells coupled to the weigh deck, and at least two staging bars coupled to the weigh deck. The weighing apparatus can be installed in an existing conveyor system so that the weigh deck and at least two staging bars are positioned underneath a conveyor belt. The weigh deck has a front end, a back end, and two side ends. One staging bar is mounted so that it is adjacent to and parallel to the front weigh deck end. Likewise, the other staging bar is mounted so that it is adjacent to and parallel to the back weigh deck end. In many cases, the staging bars are also spaced from each of the front end and the back end. The staging bars are vertically adjustable so that they can be positioned to mitigate weight variations produced by the conveyor belt. In many cases, the staging bars are positioned so they are spaced vertically from (i.e., higher than) the weigh deck. For example, the staging bars can be positioned so they are either flush with the weigh deck or less than ⅛ inch higher than the weigh deck for some applications. In the illustrated embodiment, two staging bars are used. Of course, more than two staging bars can be used in other embodiments.

In another embodiment according to the invention, a conveyor system is provided. The conveyor systems includes a frame, a conveyor belt that moves over the frame and conveys a continuous flow of material and one or more weighing apparatus. The weighing apparatus measures weight of the continuous flow of material being conveyed by the conveyor belt and comprises a weigh deck, one or more load cells, and two staging bars. The weighing apparatus is mounted to the frame so that the weigh deck is generally flush with the frame; and the weigh deck, the one or more load cells, and the two staging bars are positioned underneath the conveyor belt to mitigate weight measurement variations produced by the conveyor belt.

In yet another embodiment according to the invention, a conveyor system for automatically processing a continuous sheet of dough is provided. The conveyor system of this embodiment includes a conveyor line having a conveyor belt that conveys a continuous sheet of dough, one or more weighing apparatus, a processing apparatus that processes the continuous sheet of dough, and at least one controller that receives weight measurements from at least one weighing apparatus and uses the weight measurements to provide feedback to the processing apparatus. The one or more weighing apparatus measure the weight of the continuous sheet of dough being conveyed by the conveyor belt, is positioned underneath the conveyor belt, and is comprised of a weigh deck, one or more load cells, and the two staging bars. The two staging bars mitigate weight measurement variations produced by the conveyor belt.

DETAILED TECHNICAL DESCRIPTION

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

FIGS. 1-6 illustrate one embodiment of a weighing apparatus 10. The weighing apparatus 10 includes a weigh deck 12 having a front end 102, a back end 104, and two side ends 106, 108. The weighing apparatus 10 further includes four load cells 14, 16, 18, 20. Load cells 14, 16 are coupled to the weigh deck side end 106 and load cells 18, are coupled to the weigh deck side end 108. In the illustrated embodiment, load cell mounts 34, 36 are used to couple the load cells to the side ends 106, 108 of the weigh deck 12. For example, the load cell mount 34 can first be mounted to the side end 106 and then load cells 14, 16 can then be mounted to the load cell mount 34. Likewise, the load cell mount 36 can first be mounted to the side end 108 and then load cells 18, 20 can then be mounted to the load cell mount 36. Of course, any other mechanism of coupling the load cells to the weigh deck side ends 106, 108 can also be used.

The load cells 14, 16, 18, 20 are of any type that can measure a continuous flow of material having a weight between about 0.02 lb/ft$^2$ and about 150 lb/ft$^2$. In some cases, the load cells 14, 16, 18, 20 are sized to weigh up to 225 pounds, up to 110 pounds, or perhaps up to 44 pounds of material. The load cells 14, 16, 18, 20 each include load sensors 26, 28, 30, 32 that measure weight placed on the weigh deck 12. The load sensors 26, 28, 30, 32 input weight measurements to a controller (not shown). The controller then uses the weight measurements to provide a variety of functions. In many cases, each load sensor 26, 28, 30, 32 obtains a separate weight measurement and provides these to the controller. The controller then takes the four weight measurements and computes an average weight measurement, for example in real time, for the continuous flow of the material.

The weighing apparatus 10 also includes two staging bars 22, 24 with one mounted adjacent to and parallel to each of the front end 102 and the back end 104 of the weigh deck 12. The staging bars 22, 24 are also typically spaced away from the front end 102 and the back end 104 of the weigh deck 12, although this is not required. When the weighing apparatus 10 is ultimately installed in an existing conveyor system, the weigh deck 12 and the staging bars 22, 24 will be positioned underneath a conveyor belt (not shown). The conveyor belt will run directly over and contact the weigh deck 12 and the staging bars 22, 24 under load. The staging bars 22, 24 are also vertically adjustable so that they can be positioned to mitigate weight variations produced by the conveyor belt. The staging bars 22, 24 are positioned to be either flush with or slightly higher than the weigh deck.

In the illustrated embodiment, the staging bars 22, 24 are mounted using four top staging bar mounts 46, 48, 50, 52, four bottom staging bar mounts 54, 56, 58, 60, four adjustable screw assemblies 62, 64, 66, 68, and two load cell mounts 34, 36. Specifically, one end of staging bar 22 is mounted to the top staging bar mount 48 and the other end of the staging bar 22 is mounted to the top staging bar mount 52. Likewise, one end of staging bar 24 is mounted to the top staging bar mount 46 and the other end of the staging bar 24 is mounted to the top staging bar mount 50. In some cases, the top staging bar mounts 46, 48, 50, 52 are integral to each end of the staging bars 22, 24. That is, the staging bars 22, 24 have ends configured as and part of the top staging bar mounts.

The bottom staging bar mounts 54, 56, 58, 60 are mounted to the load cell mounts 34, 36. Specifically, the load cell mount 34 has a first end 38 and a second end 40. The bottom staging bar mount 54 is coupled to the first end 38 of the mount 34. Likewise, the bottom staging bar mount 56 is coupled to the second end 40 of the mount 34. Additionally, the load cell mount 36 has a first end 42 and a second end 44. The bottom staging bar mount 58 is coupled to the first end 42 of the mount 36. Likewise, the bottom staging bar mount 60 is coupled to the second end 44 of the mount 36.

Each top staging bar mount 46, 48, 50, 52 is coupled to a corresponding bottom staging bar mount 54, 56, 58, 60 using an adjustable screw assembly 62, 64, 66, 68. For example, the top staging bar mount 46 is coupled to the bottom staging bar mount 54 through the adjustable screw assembly 62. The adjustable screw assemblies 62, 64, 66, 68 allow for each staging bar 22, 24 to be vertically adjustable. The bottom staging bar mounts 54, 56, 58, 60 remain fixed in place whereas the adjustable screw assemblies 62, 64, 66, 68 make the top staging bar mounts 46, 48, 50, 52 (and thus the staging bars 22, 24) vertically adjustable relative to the bottom staging bar mounts 54, 56, 58, 60. Skilled artisans will understand that the illustrated adjustment mechanism is only one mechanism for vertically adjusting staging bars 22, 24 and other adjustment mechanism can instead be used.

The weighing apparatus 10 can be configured to be installed in or on top of a conveyor system. In the illustrated embodiment, the weighing apparatus 10 has two conveyor system mounts 94, 96 that are configured to be coupled to a conveyor line. Of course, the weighing apparatus can also be coupled to the conveyor line using other known mechanisms, such as an I-beam.

The weighing apparatus 10 can optionally include one or more level bars 70, 72, 74 that assist in installing the weighing apparatus 10 to an existing conveyor system. The level bars 70, 72, 74 help to ensure that the weigh deck 12 is generally flush with the existing conveyor line. In the illustrated embodiment, the level bar 70 includes a handle 76 and two dials 86, 88; the level bar 72 includes two handles 78, 80 and a dial 90; and the level bar 74 includes two handles 82, 84 and a dial 92. The one or more level bars 70, 72, 74 assist one in installing the weighing apparatus 10. The dials 86, 88, 90 are depth gauges in some embodiments that show the difference, in fractions of an inch, between the height of the weigh deck to the staging bars. Once the weighing apparatus 10 has been installed, the level bars 70, 72, 74 can be removed. While three level bars are shown, skilled artisans understand that only one level bar may be used.

A conveyor system is also provided having a frame and a conveyor belt that moves over the frame to convey a continuous flow of material. The conveyor system also includes a weighing apparatus 10 that measures the weight of the continuous flow of material being conveyed by the conveyor belt. The weighing apparatus 10 can be of any embodiments already described and generally includes a weigh deck 12, one or more load cells, and two staging bars. The weigh deck 12, one or more load cells, and two staging bars are positioned underneath the conveyor belt.

The conveyor system also includes a controller, wherein the weighing apparatus 10 inputs weight measurements to the controller. The conveyor system can be part of any production line. The controller can be programmed to take weight readings continuously, intermittently or on-demand when prompted to do so by an operator. In some cases, the weighing apparatus 10 includes load cells each having load sensors that measure weight of the moving continuous flow of material. The load sensors input the weight measurements to the controller. The controller can also be coupled to other components of the conveyor system, wherein the controller uses inputted weight measurements to provide feedback to the other system components.

Figure 1:
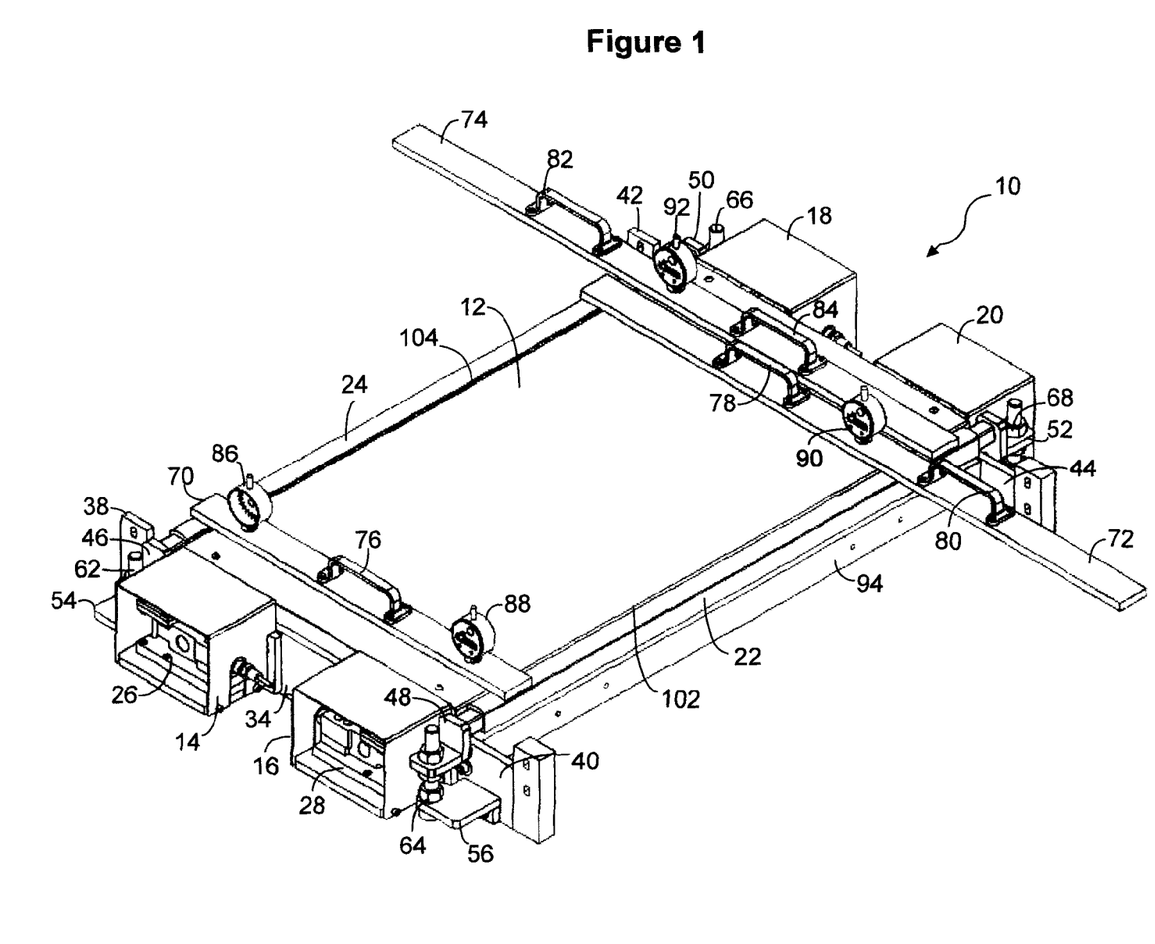
FIG. 1 is a perspective view of a weighing apparatus in accordance with one embodiment.
Figure 2:
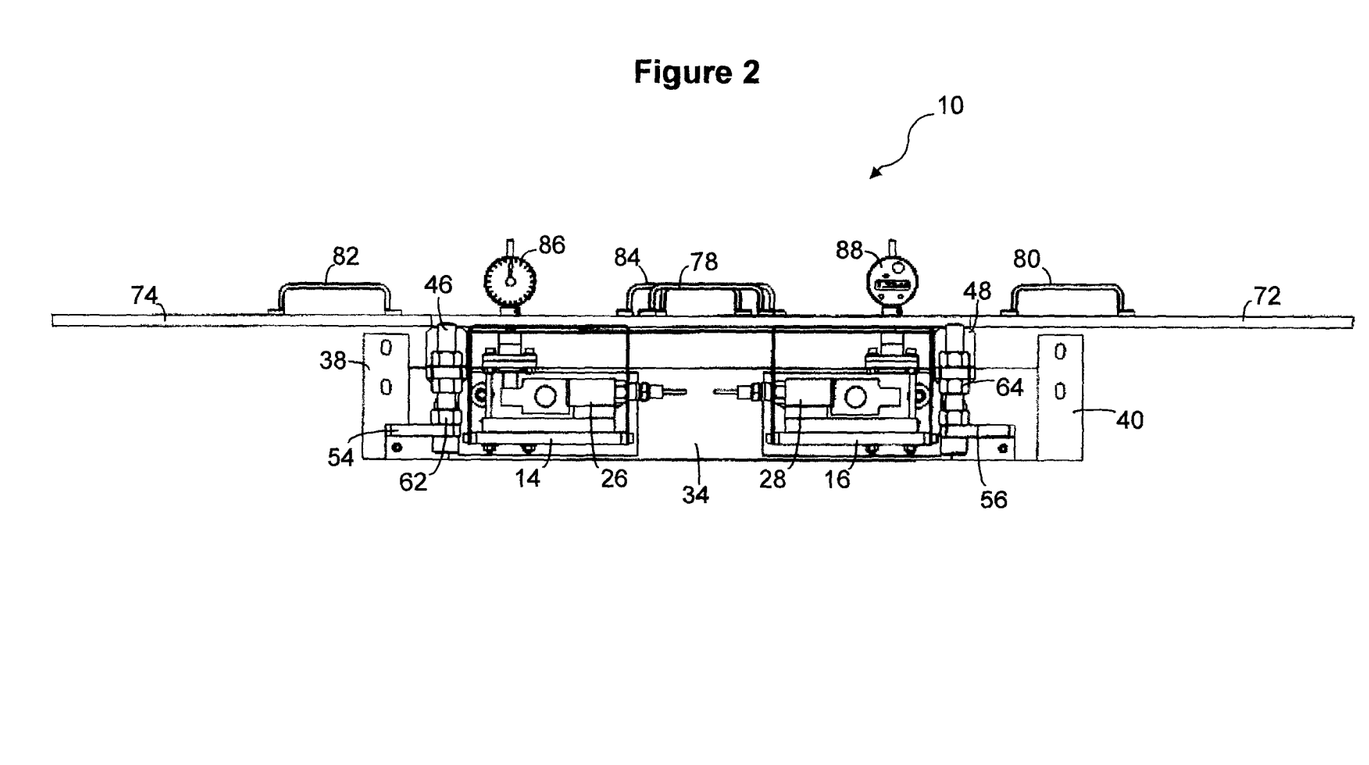
FIG. 2 is an end view of a weighing apparatus in accordance with one embodiment.
Figure 3:
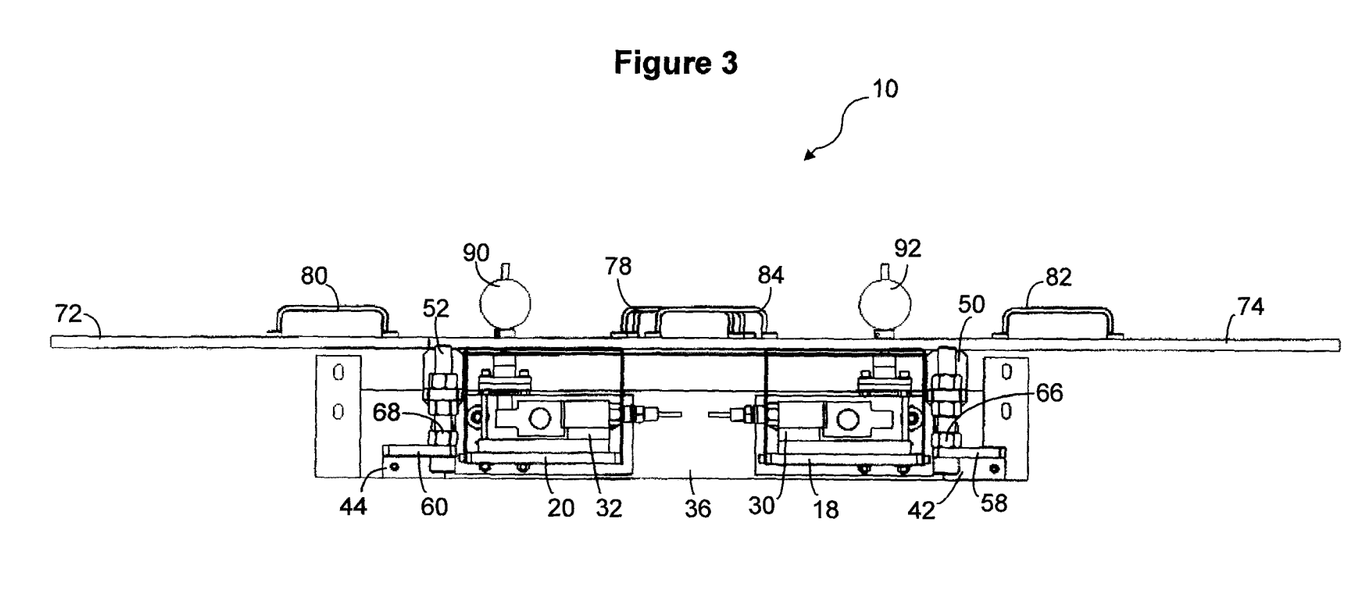
FIG. 3 is an opposite end view of a weighing apparatus in accordance with one embodiment.
Figure 4:
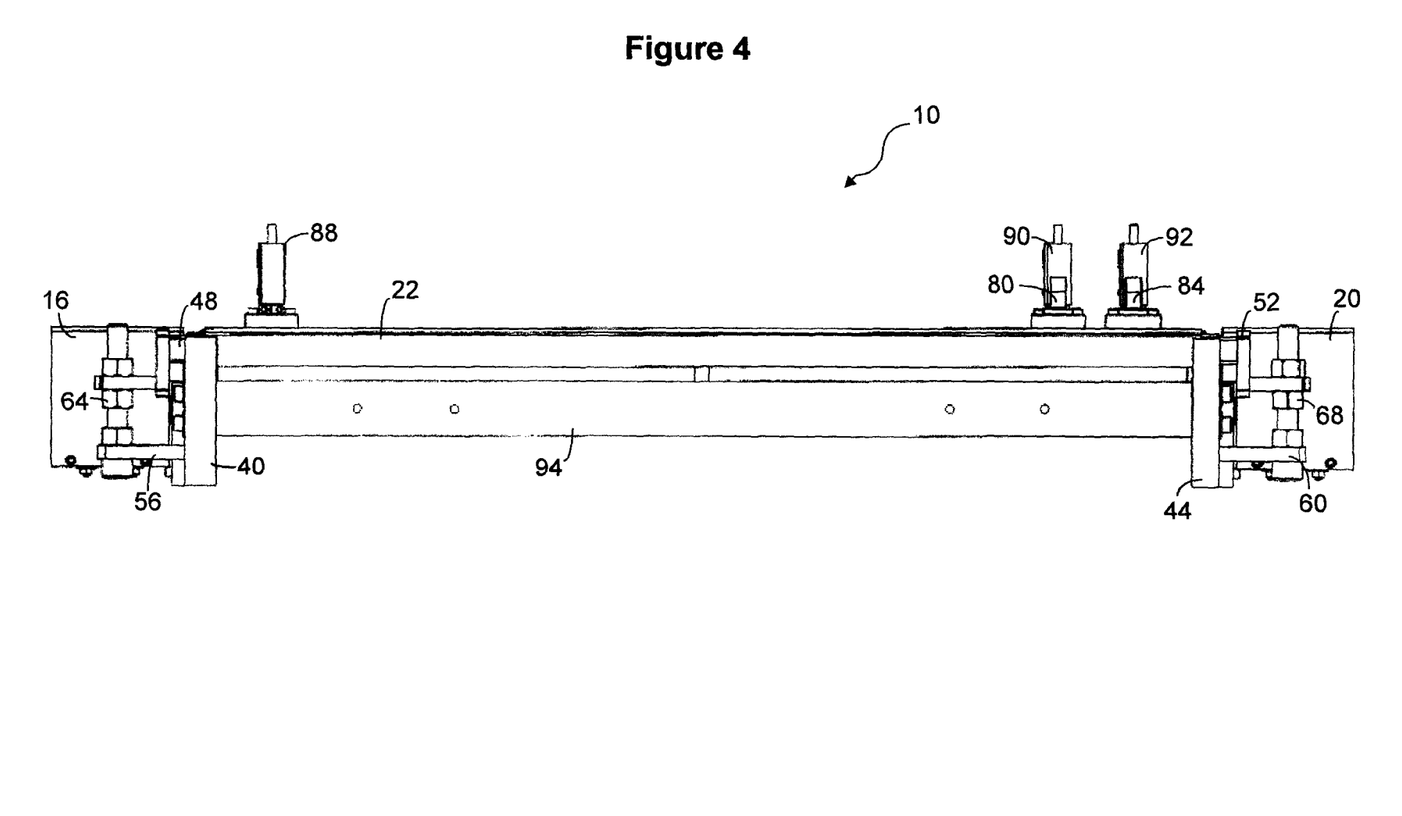
FIG. 4 is a side view of a weighing apparatus in accordance with one embodiment.
Figure 5:
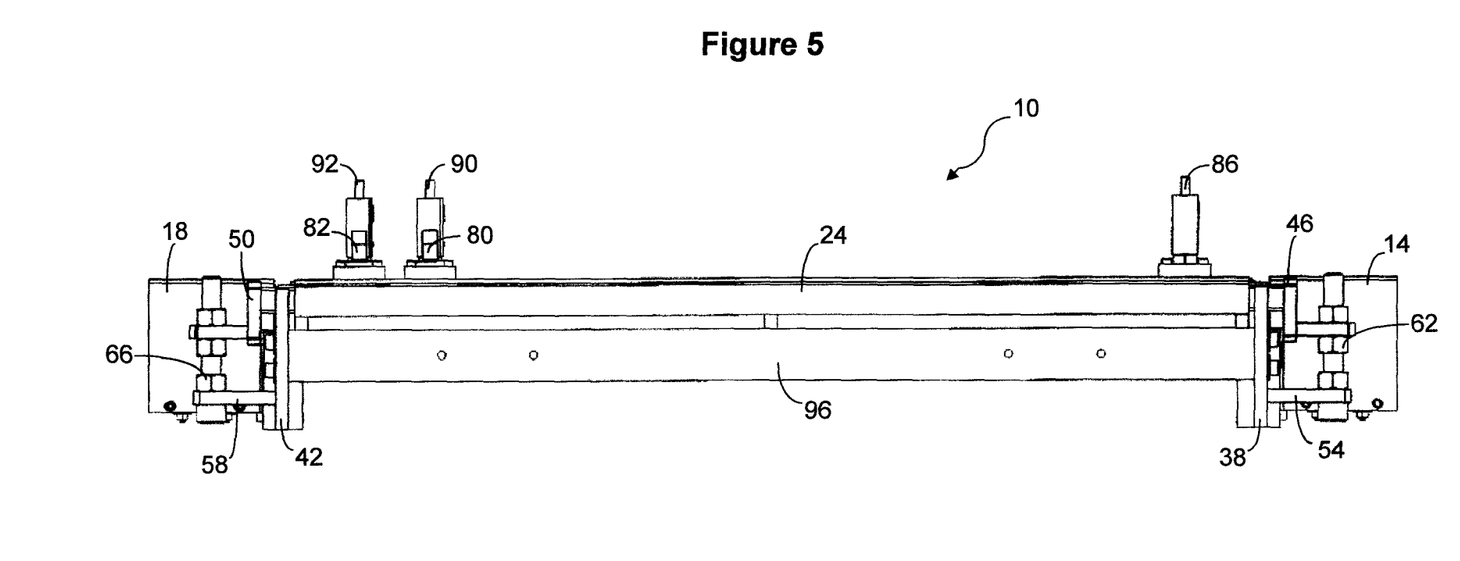
FIG. 5 is an opposite side view of a weighing apparatus in accordance with one embodiment.
Figure 6:
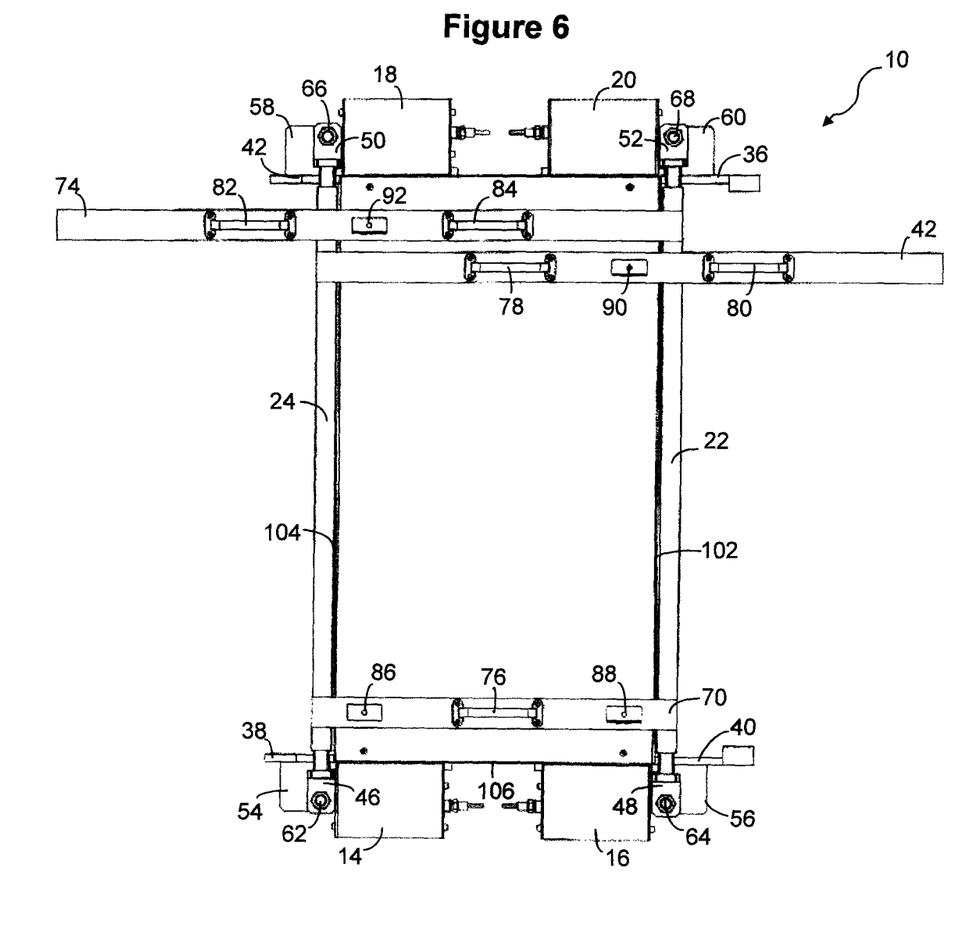
FIG. 6 is a top view of a weighing apparatus in accordance with one embodiment.
Figure 7:
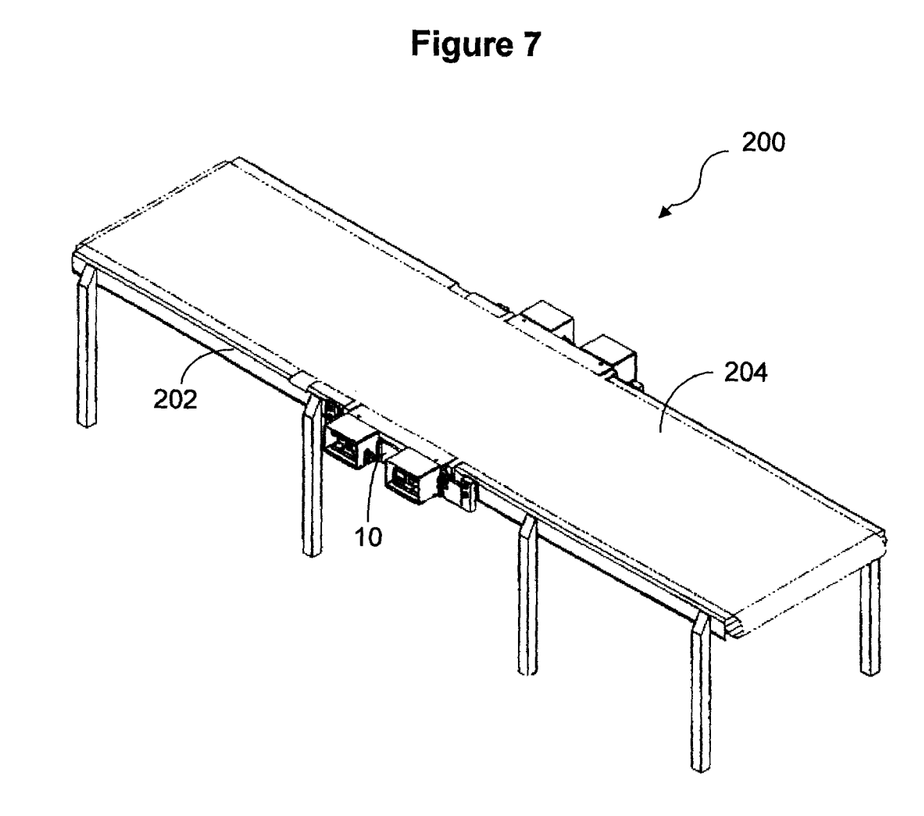
FIG. 7 is a side view of a general conveyor system incorporating a weighing apparatus in accordance with one embodiment.

FIG. 7 illustrates a conveyor system 200 having the weighing apparatus 10 shown in FIGS. 1-6 installed therein. The conveyor system 200 has a frame 202, wherein a conveyor belt 204 moves over the frame 202. In this embodiment, the weighing apparatus 10 is mounted to the conveyor system frame 202 so that the weigh deck 12 is generally flush with the conveyor line. The weighing apparatus 10 is also positioned so that the conveyor belt 204 moves over the staging bars 22, 24 and the weigh deck 12.

The staging bars 22, 24 help to obtain accurate weight measurements because they help negate the effects the conveyor belt tension or speed has on weight measurements. For example, conveyor belt speeds and belt tensions can sometimes cause inaccurate fluctuations in weight measurements. In many types of conveying systems, conveyor belt speeds and belt tensions often change during the conveying process, and these changes can in turn cause fluctuations in the weight measurements. However, the inventors have discovered that the use of adjustable staging bars 22, 24 helps to offset negative or undesirable effects due to variations in conveyor belt speed and belt tension and helps to provide more accurate weight measurements.

With respect to belt tension, the staging bars 22, 24 isolate the weighing apparatus 10 from upstream and downstream belt tension effects. In other words, the staging bars 22, 24 isolate a smaller section of the overall conveyor line. If the belt tension is tightened or loosened, the effect on the weight measurement is minimal compared to if the staging bars 22, 24 did not exist. If the staging bars 22, 24 did not exist or were set lower than the weigh deck 12, the effect of tightening or loosening the belt would be detected in the weight measurement.

The staging bars 22, 24 also help to mitigate effects of weight on the conveyor line that is upstream or downstream of the weighing apparatus 10. For example, the staging bars 22, 24 help prevent upstream and downstream weight from being detected in the weight measurements. In other words, the staging bars 22, 24 help to make sure the weighing apparatus 10 only detects weight that is being conveyed over the weigh deck 12 at the time of weighing.

Once the weighing apparatus 10 is installed so that the weigh deck 12 and staging bars 22, 24 are underneath the conveyor belt 204, the staging bars 22, 24 may be adjusted as necessary to mitigate weight variations produced by the conveyor belt 204. In some cases, the staging bars 22, 24 are positioned so they are spaced away from the front end 102 and back end 104 of weigh deck 12. In certain cases, the staging bars 22, 24 have a topmost portion that is spaced from (i.e. higher than) a topmost portion of the weigh deck 12. For example, the staging bars 22, 24 can be adjusted so they have a topmost portion that is less than an inch higher than a topmost portion of the weigh deck 12. In specific cases, the staging bars 22, 24 can be adjusted so they have a topmost portion that is about 0.0001 inches higher than a topmost portion of the weigh deck 12. The inventors have discovered that by positioning the staging bars 22, 24 so that they are either flush with or slightly higher than the weigh deck 12, the staging bars 22, 24 pull the conveyor belt 204 slightly upward before the belt moves over the weigh deck under load, which helps to offset negative effects of variations in conveyor belt speeds and belt tensions.

The staging bars 22, 24 can be vertically adjusted separately or together. That is the staging bars 22, 24 can have the same position relative to the weigh deck 12 or different positions relative to the weigh deck 12. For example, in some cases, the staging bars 22, 24 are adjusted so that staging bar 22 has a bottommost portion that is spaced from the topmost portion of the weigh deck 12 by a predetermined length and the staging bar 24 has a bottommost portion that is spaced from the topmost portion of the weigh deck 12 by a length that is either larger or smaller than the predetermined length. In other cases, the staging bars 22, 24 are adjusted so that both staging bars 22, 24 have a bottommost portion that is spaced from the topmost portion of the weigh deck 12 by the same predetermined length.

A method of installing a weighing apparatus 10 in an existing conveyor system 200 is also provided. The method includes the steps of: providing a weighing apparatus 10 comprising a weigh deck 12, one or more load cells, and two vertically adjustable staging bars 22, 24; installing the weighing apparatus 10 in an existing conveyor system 200 having a frame 202 and a conveyor belt 204 so that the weigh deck 12 is generally flush with the frame 202 and the weigh deck 12 and the vertically adjustable staging bars 22, 24 are positioned underneath the conveyor belt 204; and adjusting the vertically adjustable staging bars 22, 24 so that the staging bars 22, 24 are positioned to mitigate weight measurement variations produced by the conveyor belt 204. In some cases, the step of adjusting the vertically adjustable staging bars comprises adjusting the staging bars 22, 24 to be higher than the weigh deck 12. In certain cases, the step of adjusting the vertically adjustable staging bars comprises adjusting the staging bars 22, 24 to be less than ⅛ inch higher than the weigh deck 12. In other cases, the step of adjusting comprises adjusting the stage bars 22, 24 to different vertical heights relative to the weigh deck 12.

Figure 8:
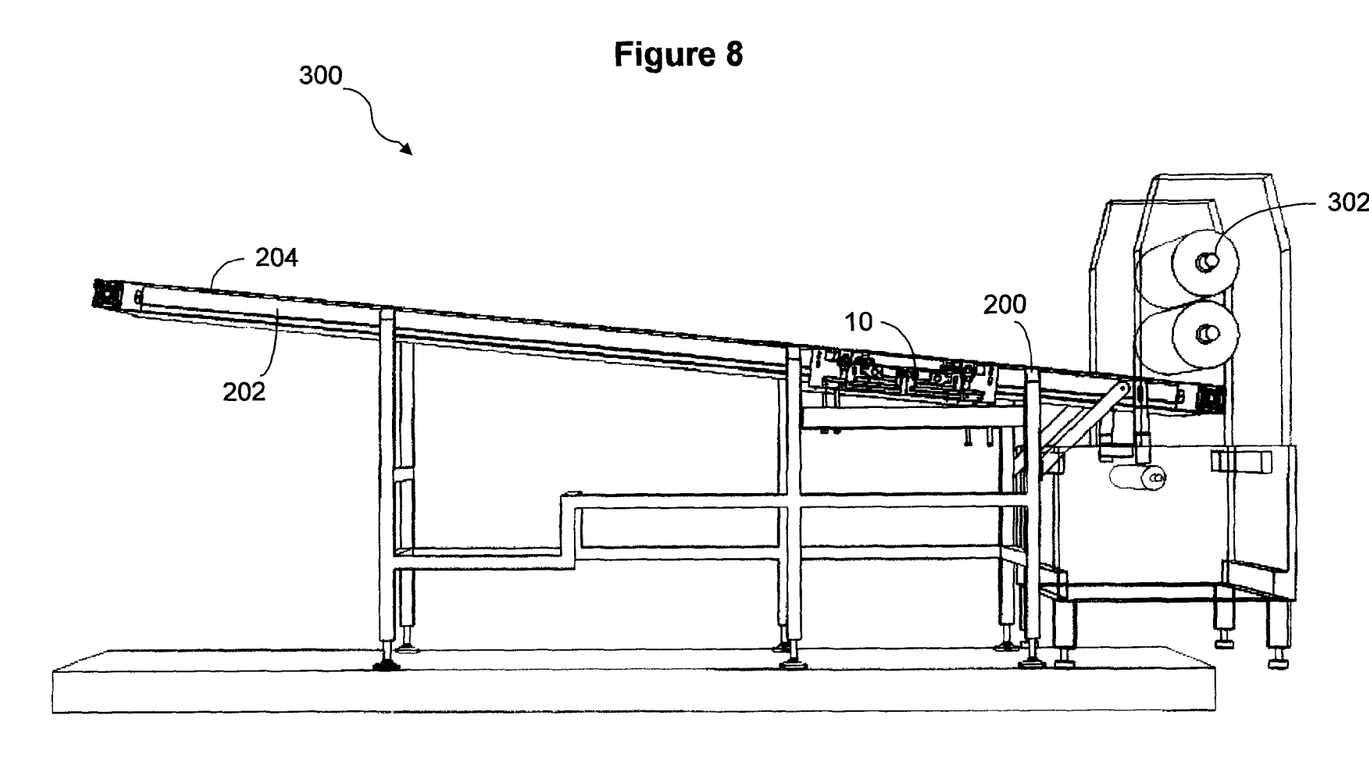
FIG. 8 is a side view of a section of a dough production line having an extruding station followed by a conveyor system incorporating a weighing apparatus in accordance with one embodiment.
Figure 9:
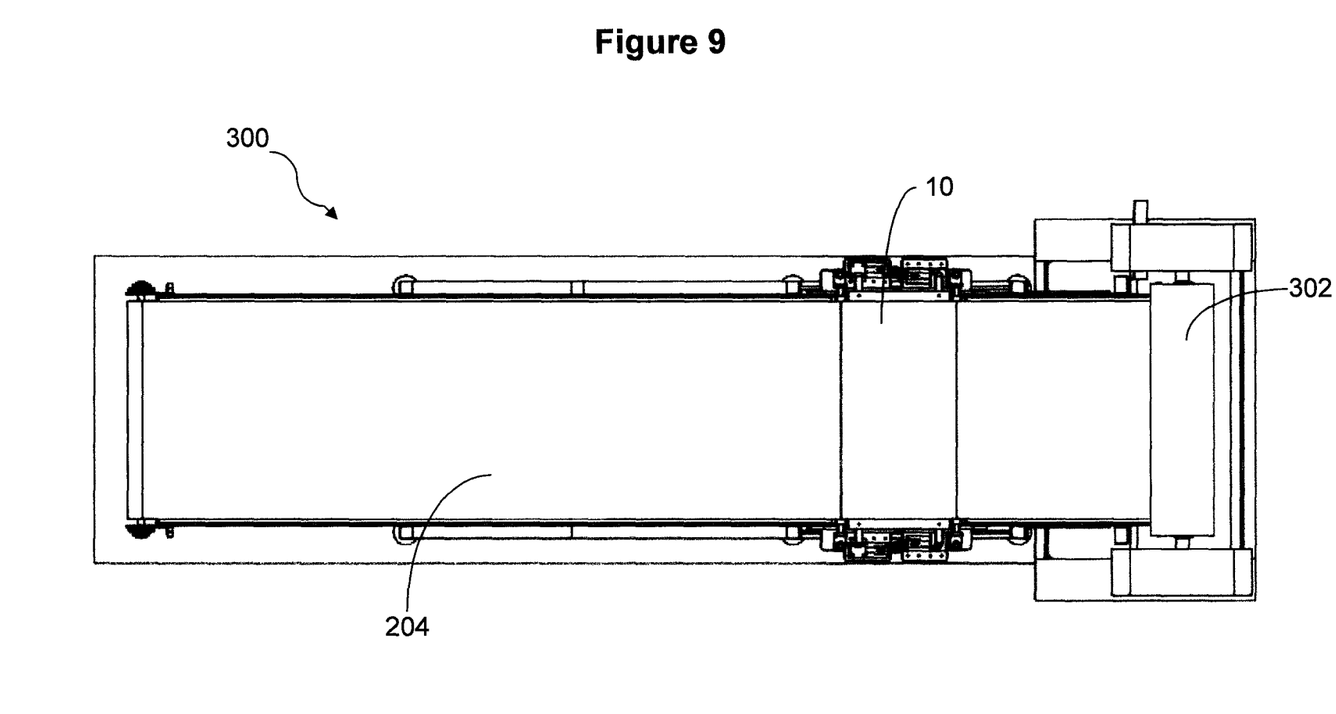
FIG. 9 is a top view of a section of a dough production line having an extruding station followed by a conveyor system incorporating a weighing apparatus in accordance with one embodiment.

In some cases, the conveyor system 200 is part of a dough production line and the continuous flow of material is a continuous sheet of dough. FIGS. 8-9 each illustrate conveyor systems part that are of a dough production line that conveys a continuous sheet of dough. Each of these conveyor systems also have a weighing apparatus 10 installed therein.

FIGS. 8 and 9 illustrate a dough production line section 300 that includes an extruding apparatus 302 followed by a conveyor system 200 including a weighing apparatus 10. Dough products are produced by placing dough through the extruding apparatus 302 and extruding a sheet or ribbon of dough onto the conveyor belt system 204, typically in a continuous flow. The conveyor system 200 includes a weighing apparatus 10 mounted therein so that the conveyor belt 204 moves over the weighing apparatus 10. The conveyor belt 204 conveys the sheet or ribbon of dough over the apparatus 10, which then obtains one or more weight measurements. The weight measurements are then inputted to a controller (not shown), which is in electronic communication with the extruding apparatus 302 and uses the weight measurements to provide feedback to the extruding apparatus 302.

In some cases, the feedback instructs the extruding apparatus 302 to increase or decrease extrusion of dough. In other words, the feedback tells the extruding apparatus 302 to increase or decrease the mass flow of dough (e.g., in lbs/min) that exits the extruding apparatus 302 onto the conveyor belt 204. For example, the controller can be configured to provide feedback to the extrusion apparatus 302 so that it extrudes a continuous sheet of dough having a predetermined weight measurement. If the weight measurements obtained are larger than the predetermined weight measurement set by the controller, the controller instructs the extruding apparatus 302 to increase extrusion of dough in order to produce dough having a lower weight measurement. Likewise, if the weight measurements obtained are smaller than the predetermined weight measurement set by the controller, the controller instructs the extruding apparatus 302 to decrease extrusion of dough in order to produce dough having a higher weight measurement. In certain embodiments, the controller uses one or more algorithms to provide feedback to the extruding apparatus 302. The use of algorithms allows the controller to specifically control the amount of increase or decrease of dough extrusion, which makes it easier to obtain the predetermined weight measurement or set point.

In other embodiment, the weighing apparatus 10 can be used with a section of a dough production line 300 that includes a food deposition apparatus. For example, the section can include a conveyor system 200 including a weighing apparatus 10 followed by a food deposition apparatus. The food deposition apparatus can be any apparatus, e.g., a pump, that deposits food onto the dough sheet. For example, the food deposition apparatus can deposit food materials or particulates, such as shortening, flour, chocolate chips, raisins, oats and the like onto the dough sheet. In some cases, the food deposition apparatus is a shortening pump that deposits shortening onto the dough sheet. The weighing apparatus 10 mounted in the conveyor system 200 so that a conveyor belt 204 moves over the weighing apparatus 10. As the conveyor belt 204 conveys the continuous sheet of dough over the weighing apparatus 10, the weighing apparatus 10 obtains one or more weight measurements. The weight measurements are then inputted to a controller, which is in electronic communication with the food deposition apparatus and uses the weight measurement to provide feedback to the food deposition apparatus.

In some cases, the feedback instructs the food deposition apparatus to increase or decrease deposition speed of food. In certain cases, the controller uses one or more algorithms to provide feedback to the food deposition apparatus. For example, the algorithms can correlate different weight measurements with different food deposition speeds. Thus, as the dough sheet moves over the weighing apparatus 10, the weighing apparatus 10 obtains different weight measurements that prompts the controller to in turn adjust the food deposition speed.

In yet other embodiments, the weighing apparatus 10 can be used with a section of a dough production line 300 that includes a reducing apparatus. For example, the section can include a conveyor system 200 including a weighing apparatus 10 followed by a reducing apparatus. The reducing apparatus is an apparatus that further rolls over and reduces dough sheet thickness. Again, the weighing apparatus 10 mounted in the conveyor system 200 so that a conveyor belt 204 moves over the weighing apparatus 10. As the conveyor belt 204 conveys the continuous sheet of dough over the weighing apparatus 10, the weighing apparatus 10 obtains one or more weight measurements. The weight measurements are then inputted to a controller, which is in electronic communication with the reducing apparatus and uses the weight measurement to provide feedback to the reducing apparatus.

In some cases, the feedback instructs the reducing apparatus to increase or decrease dough thickness. For example, the controller can be configured to provide feedback to the reducing apparatus so that it increases or decreases dough sheet thickness depending on the weight measurement obtained by the weighing apparatus 10. Here too, the controller can use one or more algorithms to provide feedback to the reducing apparatus. For example, the algorithms can correlate different weight measurements with different rolling/reducing actions that produce different dough sheet thicknesses. For example, in some cases, the reducing apparatus includes two rollers. If the controller instructs the reducing apparatus to increase dough sheet thickness, the two rollers can move further apart from one another or perhaps roll the dough sheet more times. Likewise, if the controller instructs the reducing apparatus to decrease dough sheet thickness, the two rollers can move closer together or perhaps roll the dough sheet fewer times. The use of algorithms allows for the controller to specifically control the amount of increase or decrease in dough sheet thickness.

As shown, the present weighing apparatus 10 is useful in various conveyor systems 200 of a dough production line 300. Final dough products sometimes experience variability in amounts of the deposited food materials. For example, shortening variability can sometimes occur during the conveying process if there are variations in the dough sheet. Variations can occur, for example, when a dough sheet has holes or wrinkles in it. As the dough sheet is conveyed past a shortening pump, the pump deposits shortening onto the sheet. If there are variations in the sheet, some parts of the sheet will have a lower or higher percentage of shortening to dough than other parts of the sheet. This can contribute to shortening variation in a final product. The above-described weighing apparatus 10 now makes it possible for existing conveyor systems to weigh continuous sheets of dough. Weight measurements obtained by the weighing apparatus 10 can be inputted to a controller which detects dough sheet variation and then provides feedback to dough production line components that can correct or account for these variations. Thus, the weighing apparatus 10 helps to reduce variation in a final product.

Conveyor systems or production lines according to embodiments of the invention may include one or more weighing apparatus and/or one or more controllers. A single weighing apparatus can be in electronic communication with a single controller or more than one controller which in turn can regulate one or more processing apparatus. If a plurality of weighing apparatus are staged along a productions line, they may be in electronic communication with a single controller, or each of them could be in separate communication with separate controllers, or more than one of the weighing apparatus could be in communication with one or more controllers, regulating single or multiple processing apparatus.

In the foregoing detailed description, the invention has been described with reference to specific embodiments. However, it may be appreciated that various modifications and changes can be made without departing from the scope of the invention as set forth in the appended claims.

The invention claimed is:

1. A conveyor system, comprising:
   a frame;
   a conveyor belt that moves over the frame and conveys a continuous flow of material;
   one or more weighing apparatus comprising a weigh deck, one or more load cells, and two staging bars, wherein the weighing apparatus is mounted to the frame so that the weigh deck is generally flush with the frame, wherein the weigh deck, the one or more load cells, and the two staging bars are positioned underneath the conveyor belt, wherein the two staging bars are positioned at a vertically elevated height above the weigh deck and mitigate weight measurement variations upstream and downstream of the weigh deck, and wherein the one or more weighing apparatus measures weight of the continuous flow of material being conveyed by the conveyor belt.

2. The conveyor system of claim 1 wherein the continuous flow of material is a material having a weight of less about 10 lb/ft$^2$.

3. The conveyor system of claim 2 wherein the continuous flow of material is a material having a weight of less about 5 lb/ft$^2$.

4. The conveyor system of claim 1 wherein the continuous flow of material has an actual weight, and the one or more weighing apparatus obtains a measured weight that is approximately 80% or more of the actual weight.

5. The conveyor system of claim 1 wherein the continuous flow of material is a continuous sheet of dough.

6. The conveyor system of claim 1 wherein the one or more load cells comprise four load cells.

7. The conveyor system of claim 1 wherein the two staging bars are vertically adjustable relative to the weigh deck.

8. The conveyor system of claim 1 further comprising one or more controllers, wherein at least one weighing apparatus inputs weight measurements to at least one controller.

9. The conveyor system of claim 8 wherein at least one controller uses the weight measurements to provide feedback to other components of the conveyor system.

10. The conveyor system of claim 9 wherein the conveyor system is part of a dough production line and the other components of the conveyor system include an extruding station, a reduction station, or a food deposition station.

11. A conveyor system for automatically processing a continuous sheet of dough, comprising:
    a conveyor line having a conveyor belt that conveys a continuous sheet of dough;
    one or more weighing apparatus comprising a weigh deck, one or more load cells, and two staging bars, wherein the weigh deck, the one or more load cells, and the two staging bars are positioned underneath the conveyor belt, wherein the two staging bars are positioned at a vertically elevated height above the weigh deck and mitigate weight measurement variations upstream and downstream of the weigh deck, and wherein the one or more weighing apparatus measures weight of the continuous sheet of dough being conveyed by the conveyor belt;
    a processing apparatus that processes the continuous sheet of dough; and
    at least one controller that receives weight measurements from at least one weighing apparatus and uses the weight measurements to provide feedback to the processing apparatus.

12. The system of claim 1, wherein the two staging bars are positioned in contact with the conveyor belt.

13. The system of claim 1, wherein the vertically elevated height is less than 1/8 of an inch higher than the weigh deck.

14. The system of claim 1, wherein the weigh deck and the two staging bars are positioned underneath the conveyor belt such that the conveyor belt runs directly over and in contact with the weigh deck and staging bars.

15. The system of claim 11, wherein the vertically elevated height is less than 1/8 of an inch higher than the weigh deck.

16. The system of claim 11, wherein the two staging bars are vertically adjustable relative to the weigh deck.

17. The system of claim 11, wherein the weigh deck and the two staging bars are positioned underneath the conveyor belt such that the conveyor belt runs directly over and in contact with the weigh deck and staging bars.

* * * * *